United States Patent [19]

Altman

[11] Patent Number: 4,665,942

[45] Date of Patent: May 19, 1987

[54] HYDRAULIC PRESSURE FUSE

[75] Inventor: Yevgeny Altman, Des Plaines, Ill.

[73] Assignee: Clevite Industries Inc., Glenview, Ill.

[21] Appl. No.: 849,778

[22] Filed: Apr. 9, 1986

[51] Int. Cl.$^4$ .............................................. F16K 17/22
[52] U.S. Cl. .................................... 137/490; 137/491; 137/498
[58] Field of Search ............... 137/456, 460, 486, 487, 137/490, 498

[56] References Cited

U.S. PATENT DOCUMENTS 3,545,484 12/1970 Allen .................................... 137/490

Primary Examiner—Robert G. Nilson
Attorney, Agent, or Firm—Russell E. Baumann

[57] ABSTRACT

A hydraulic fuse closes flow of hydraulic fluid in a hydraulic line upon loss of downstream fluid pressure. The hydraulic fuse includes a housing having an upstream opening and a downstream opening and a poppet slidably mounted within the housing for opening and closing fluid flow between the upstream and downstream openings. A spool is slidably mounted within the poppet for opening and closing fluid flow between first and second ends of the poppet. The spool includes a head which is positioned within the poppet and a rod which extends outwardly from the second end of the poppet and into the housing. When downstream pressure is lost, differential pressure acting on the first and second ends of the poppet will move the poppet to close fluid flow.

14 Claims, 4 Drawing Figures

HYDRAULIC PRESSURE FUSE

BACKGROUND AND SUMMARY

This invention relates to a hydraulic fuse, and, more particularly, to a hydraulic pressure fuse which is normally closed and which opens when downstream fluid pressure reaches a predetermined operating pressure and which closes when downstream pressure falls below the operating pressure.

A hydraulic fuse is interposed in a hydraulic fluid line for closing fluid flow through the line when downstream pressure is lost, for example, when the line ruptures. Hydraulic fuses are commonly called velocity fuses, quantity fuses, excess flow protectors, automatic stop valves, safety valves, etc. Such fuses are conventionally normally open valves and are actuated when fluid flow or volume exceeds a preset rate.

The invention provides a hydraulic pressure fuse which is a normally closed valve and which is operated by differential pressure between the upstream and downstream sides of the valve. The valve is opened when the downstream pressure reaches a predetermined operating pressure. If the downstream pressure falls below the operating pressure, the valve closes regardless of the upstream pressure, flow rate, or volume. The valve resets automatically and includes a manual override and position-indicating pin.

DESCRIPTION OF THE DRAWING

The invention will be explained in conjunction with an illustrative embodiment shown in the accompanying drawing, in which.

DESCRIPTION OF THE SPECIFIC EMBODIMENT

Figure 1:
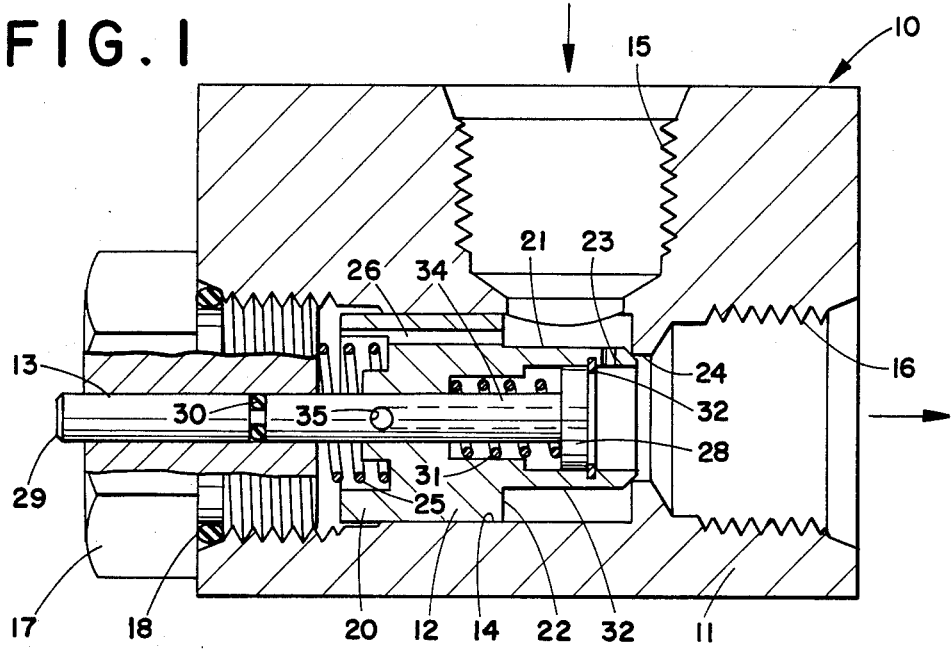
FIG. 1 is a sectional view of a hydraulic pressure fuse formed in accordance with the invention showing the fuse in the closed position.

A hydraulic fuse 10 includes a housing 11, a poppet 12, and a spool 13. The poppet is slidable within a cylindrical bore or passage 14 in the housing. The passage 14 connects an upstream opening or inlet 15 and a downstream opening or outlet 16. A cap 17 is threadedly engaged with the internal passage 14, and a gasket 18 provides a seal between the cap and the housing.

The poppet 12 includes a cylindrical body 20 which is slidable within the cylindrical passage 14 and a tubular sealing portion 21 which projects forwardly or to the right from the body 20. An annular shoulder 22 extends transversely between the body 20 and the sealing portion 21. A small charging orifice 23 is provided in the sealing portion.

The right or forward end of the sealing portion 21 terminates in a conical sealing surface which is engageable with a seat 24 in the housing for sealing the passage 14 and upstream inlet opening from the downstream opening 16 except for the charging orifice 23. The left or rear end of the poppet is provided with an annular recess for receiving one end of a coil spring 25. The other end of the coil spring engages the cap 17, and the spring resiliently biases the poppet toward the closed position illustrated in FIG. 1 in which the sealing portion 21 engages the seat 24. A pilot passage 26 extends through the poppet between the annular shoulder 22 and the rear end of the poppet.

The spool 13 includes a cylindrical head 28 which is slidable within the tubular sealing portion 21 of the poppet due to small clearance and a rod 29 which is slidable within an axially extending internal passage in the poppet. The rod extends outwardly from the rear end of the poppet and through the cap 17. Preferably an O-ring 30 is retained in a groove in the rod and provides a seal between the rod and the cap.

The spool is resiliently biased to the right by a coil spring 31. The coil spring is confined between an annular shoulder in the internal passage of the poppet and the head 28 of the spool. A retaining ring 32 is positioned in a groove in the sealing portion 21 and prevents the spool from moving to the right beyond its FIG. 1 position.

Figure 2:
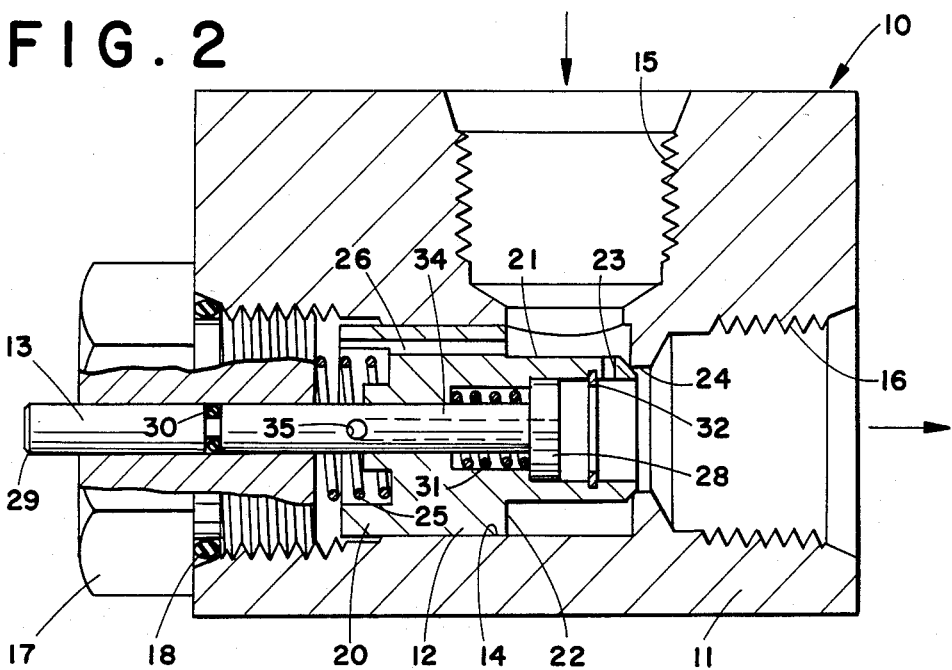
FIG. 2 is a view similar to FIG. 1 showing the spool of the fuse shifted to the left.
Figure 3:
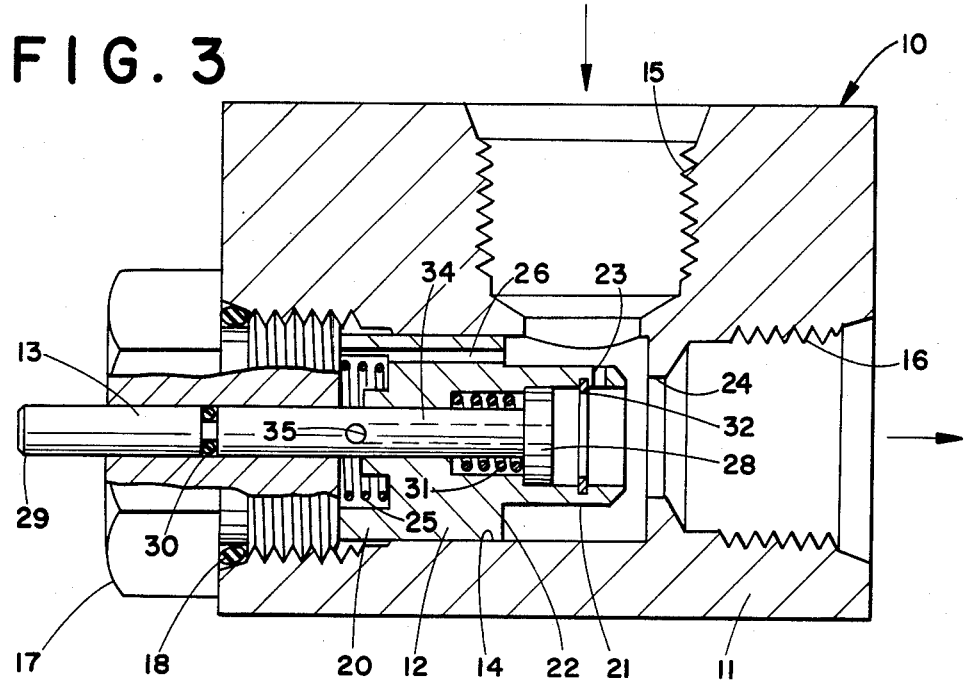
FIG. 3 is a view similar to FIGS. 1 and 2 showing the fuse in the open position.

The spool 13 is provided with an internal passage 34 which extends from the head end of the spool to a lateral opening 35. When the spool engages the retaining ring 32 as illustrated in FIG. 1, the opening 35 is positioned within the poppet, thereby preventing fluid flow through the passage within the spool. When the spool is moved to the left relative to the poppet to expose the opening 35 (FIGS. 2 and 3), fluid can flow from the rear end of the poppet through the spool to the front end of the poppet.

The fuse is interposed in a hydraulic line or conduit by connecting the upstream line to the upstream opening 15 and connecting the downstream line to the downstream opening 16. The upstream line is connected to a source of pressurized hydraulic fluid, e.g., a hydraulic motor or pump, and the downstream line is connected to an implement which is operated by hydraulic fluid.

When the poppet 12 and the spool 13 are in their closed positions illustrated in FIG. 1, fluid flow from the upstream opening 15 to the downstream opening 16 is prevented except for a small flow through the charging orifice 23. As will be explained more fully hereinafter, this is the position the fuse will assume if there is a rupture in the downstream line. The fuse thereby prevents great loss of hydraulic fluid in the event of line rupture.

When the hydraulic pump upstream of the fuse is turned on, high pressure hydraulic fluid in the upstream opening 15 flows through the pilot passage 26 in the poppet 12 and fills the spring chamber for the spring 25 behind the poppet. High pressure fluid acts against the rear end of the poppet and on the front end of the poppet minus the area of the seat 24. Since the area of the rear end of the poppet is greater than the area of the front end of poppet minus the area of the seat 24, the differential force on the poppet will hold the poppet in the closed position.

As fluid flows through the charging orifice 23, pressure in the downstream line will build up. Eventually, the pressure in the downstream opening 16 will be sufficient to overcome the force of the spring 31 which holds the spool 13 in the closed position and lateral opening 35 closed. The spool will then shift to the left (See FIG. 2) and move the lateral opening 35 in the rod beyond the rear end of the poppet.

When the spool shifts to the left, high pressure fluid behind the poppet flows through the internal passage in the spool and into the downstream opening 16. The pressure on the downstream side of the fuse will help cause the poppet to shift to the left away from the seat 24 (See FIG. 3). High pressure fluid can then flow directly from the upstream opening 15 to the downstream opening 16.

The force on the poppet which tends to move the poppet toward the seat 24 is the pressure behind the poppet multipled by the area of the rear end of the poppet minus the area of the rod 29. The force on the poppet which tends to move the poppet away from the seat is the pressure in the upstream opening 15 multiplied by the area of the front end of the poppet minus the area of the seat 24, plus the pressure in the downstream opening 16 multiplied by the area of the seat 24. Because of the area of the rear end of the poppet against which the pressure behind the poppet acts is reduced by the area of the rod 29, the poppet will shift to the left before the downstream pressure reaches the upstream pressure.

The spring 31 which acts on the spool 13 determines the downstream pressure which is required to open the fuse. The spring force can be selected as desired to set the opening pressure. The fuse will remain closed until the downstream pressure is sufficient to overcome the force of the spring 31. The fuse will remain open as long as the downstream pressure remains higher than the opening pressure.

Figure 4:
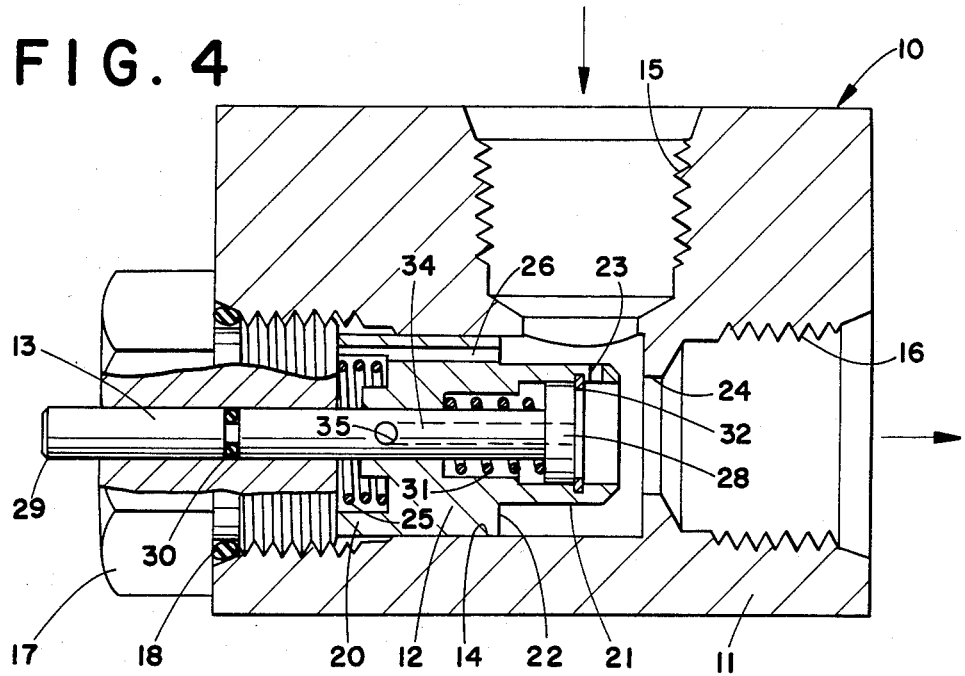
FIG. 4 is a view similar to FIGS. 1, 2 and 3 showing spool shifted to the right but fuse still in the open position.

If the downstream pressure falls below the opening pressure, for example, if the downstream line ruptures, the spool moves to the right (See FIG. 4) to close the lateral opening 35 in the spool from the rear end of the poppet 12. Flow of fluid from behind the poppet is blocked, and high pressure behind the poppet moves the poppet to the right against the seat 24.

The pressure on the rear of the poppet will close the poppet even though the effective area of the rear end of the poppet is reduced by the area of the rod. This is because of the pressure drop which the hydraulic fluid experiences when it flows through the restricted opening between the sealing portion 21 of the poppet and the seat 24. The pressure which acts on the forward end of the sealing portion 21 is therefore less than the pressure in the upstream opening 15 and the pressure behind the poppet. The pressure drop can be varied as desired by adjusting the stroke of the poppet, i.e., the distance which the poppet moves before it is stopped by the cap 17. In one embodiment of the fuse, the stroke of the poppet was 0.157 inch, and the pressure drop was 30 psi at a flow rate of 50 gallons per minute.

After the poppet closes, fluid will continue to flow through the charging orifice 23 at a slow rate. However, this low flow is acceptable even if the downstream line is ruptured.

The spring 25 provides additional closing force on the poppet and sets the valve in the normally closed position. The spring force is preferably relatively low and overcomes friction under low flow rates.

The fuse will operate under any flow rates. A pressure drop occurs as the fluid flows past the forward end of the sealing portion 21 even at low flow rates, and differential pressure acting on the poppet will cause the poppet to shift to the right when the downstream pressure falls below the opening pressure which is set by the spool spring 31.

The rear end of the rod 29 extends through the cap 17 and allows manual override of the valves within the fuse. The rod can be pulled to the left to open the poppet so that the downstream line can fill rapidly. Manual override also allows upstream hydraulic fluid to be dumped if the downstream pressure drops and the valve closes.

If downstream pressure drops and the fuse closes, the fuse will reset automatically. In other words, the fuse will be positioned to open automatically. In other words, the fuse will be positioned to open automatically after the downstream line is repaired and pressure builds up in the downstream line.

The combination of the orifices and the springs of the fuse allows full forward and reverse flow through the fuse with a minimal pressure drop. If it is desired to reverse the flow through the fuse so that fluid flows from the downstream opening 16 to the upstream opening 15, the pressure acting on the front end of the poppet will shift the poppet to the left away from the seat.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A hydraulic fuse for closing hydraulic fluid flow upon loss of downstream hydraulic pressure comprising:
    a housing having an upstream opening for receiving pressurized hydraulic fluid, a downstream opening for delivering hydraulic fluid, an internal passage connecting the upstream and downstream openings, and a poppet seat within the internal passage,
    a poppet slidably mounted in the internal passage of the housing for movement between a closed position in which the poppet engages the seat and fluid flow between the upstream and downstream opening is substantially closed and an open position in which the poppet is spaced from the seat and fluid can flow between the upstream and downstream openings, the poppet having a first end engageable with this seat and a second end opposite the first end and an internal passage in the poppet,
    passage means for supplying pressurized hydraulic fluid from the upstream opening to the second end of the poppet, and
    valve means in the internal passage of the poppet for opening and closing fluid flow through the internal passage of the poppet, the valve means being movable from a closed position to an open position when downstream fluid pressure on the first end of the poppet increases above a predetermined level.

2. The hydraulic fuse of claim 1 in which the area in which hydraulic fluid pressure can act of a radially enlarged head of said valve means and of the first end of the poppet is greater than the area of the second end of the poppet in which hydraulic fluid pressure can act.

3. The hydraulic fuse of claim 2 in which the valve means includes an elongated rod which is slidably mounted within the internal passage in the poppet and extends outwardly from the second end of the poppet into the housing thereby reducing the area of the second end upon which hydraulic fluid pressure can act.

4. The hydraulic fuse of claim 3 in which the rod includes a first end adjacent the first end of the poppet and an internal passage extending axially from the first end of the rod to a lateral orifice in the rod, the orifice being positioned within the poppet when the valve means is in the closed position and being positioned outwardly of the second end of the poppet when the valve means is in the open position.

5. The hydraulic fuse of claim 4 in which the valve means includes a radially enlarged head on the first end of the rod.

6. The hydraulic fuse of claim 1 in which said means for supplying pressurized hydraulic fluid from the upstream opening to the second end of the poppet is provided by a second internal passage within the poppet.

7. The hydraulic fuse of claim 1 in which the poppet includes a cylindrical outer surface which is slidable within the internal passage of the housing and the first end of the poppet includes an annular shoulder which extends radially inwardly from the outer surface and a tubular sealing portion which extends axially from the annular shoulder and which is engageable with said seat.

8. The hydraulic fuse of claim 7 in which said means for supplying pressurized hydraulic fluid from the upstream opening to the second end of the poppet is provided by a second internal passage within the poppet which extends from said annular shoulder to the second end of the poppet.

9. The hydraulic fuse of claim 7 in which the valve means comprises a spool slidably mounted in the internal passage in the poppet, the spool including a head within the tubular sealing portion of the poppet and a rod which extends from the head through the second end of the poppet and into the housing, the spool having an internal passage extending axially from the head to a lateral orifice in the rod, the orifice being positioned within the poppet when the valve means is in the closed position and being positioned outwardly of the second end of the poppet when the valve means is in the open position.

10. The hydraulic fuse of claim 9 including a spring within the internal passage of the poppet and engaging the head of the spool for biasing the valve means toward its closed position.

11. The hydraulic fuse of claim 9 including a spring within the internal passage of the housing and engaging the poppet for biasing the poppet toward its closed position.

12. The hydraulic fuse of claim 9 in which the rod extends outwardly from the housing whereby the spool can be manually operated from outside of the housing.

13. The hydraulic fuse of claim 9 in which the tubular sealing portion is provided with an orifice for permitting limited flow of hydraulic fluid from the upstream end of the housing to the downstream end of the housing when the poppet is closed.

14. The hydraulic fuse of claim 9 in which the rod extends outwardly from the housing and has marking means on this extension portion outside the housing to indicate poppet position in the fuse.

* * * * *